ELECTRONIC TIMER CIRCUITS
Filed Dec. 14, 1966
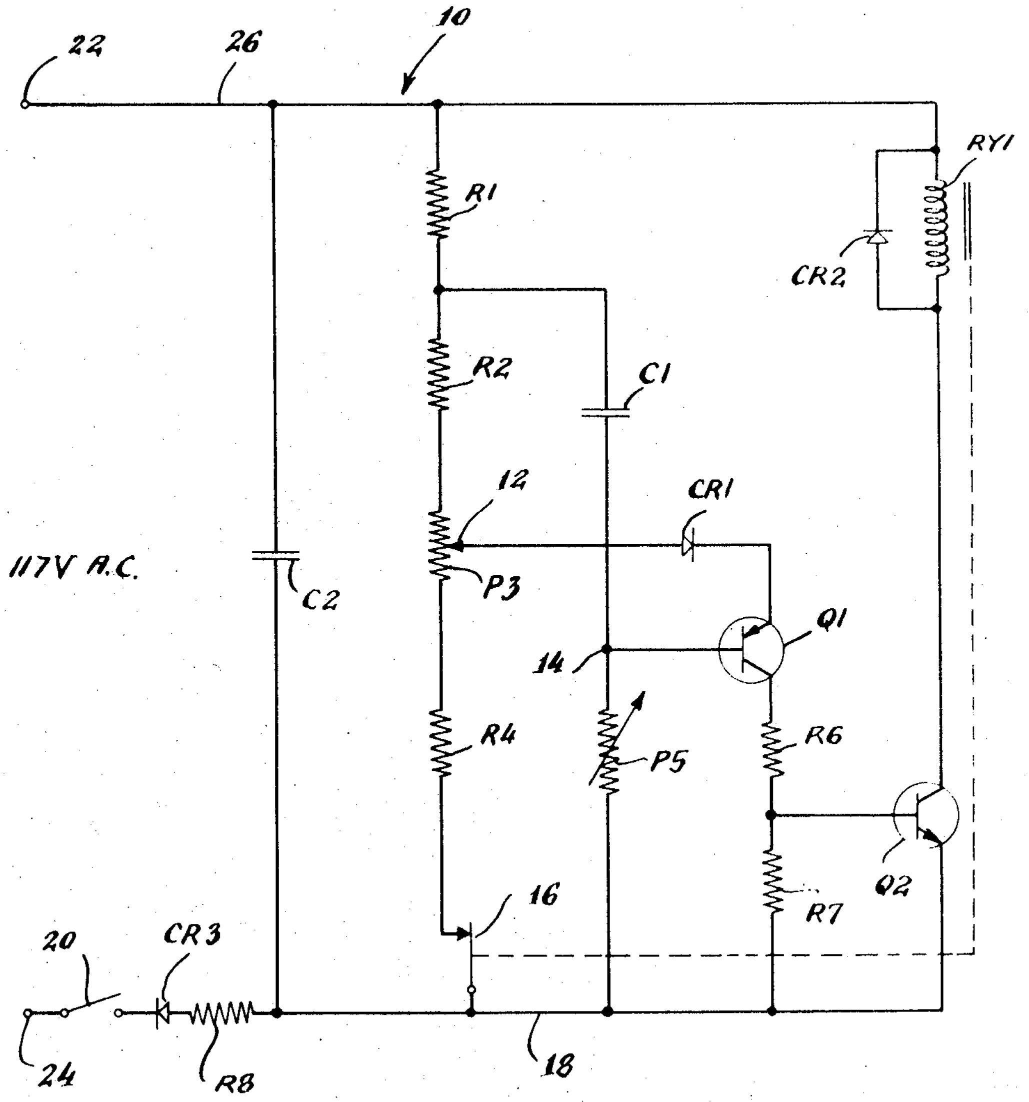
INVENTOR.
Edward T. Bosman
BY
Stephen Roen
ATTORNEY.

United States Patent Office 3,469,152
Patented Sept. 23, 1969

3,469,152
ELECTRONIC TIMER CIRCUITS
Edward T. Bosman, Watertown, Conn., assignor to General Time Corporation, Stamford, Conn., a corporation of Delaware
Filed Dec. 14, 1966, Ser. No. 601,780
Int. Cl. H01h *47/18*
U.S. Cl. 317—142 8 Claims

ABSTRACT OF THE DISCLOSURE

A delay timer having a relay output. The timer delay is measured by a resistance, capacitor, voltage divider bridge charging circuit. The charging of the capacitor is detected by a transistor. A diode connected in series with the control junction of the transistor protects this junction and provides some temperature compensation. When the charge on the capacitor reaches a predetermined value, the relay is energized. Energization of the relay disconnects the voltage divider. The transistor is maintained in its conducting state by a small current in its emitter to base circuit since it is connected in parallel with the timing capacitor after energization of the output relay. Thus, it is not necessary to provide an electronic switch such as an SCR, a latching circuit, or holding contacts as in the prior art.

Related applications

The timer disclosed in the present application utilizes the bridge circuit timer invention disclosed and claimed in the co-pending application of Klaus Wallentowitz, Ser. No. 405,503, filed Oct. 21, 1964, entitled "Electronic Timer Circuit" (now Patent No. 3,355,632 issued Nov. 28, 1967). That application is assigned to the same assignee as the present invention and is incorporated herein by reference.

The present invention was made during a program of electronic timer development at applicant's assignee's Industrial Controls Division Engineering Department and the following United States patent applications resulting from said development exemplify the prior art: The United States patent applications of Robert S. Lundin, Ser. No. 472,844, filed July 19, 1965, entitled "Condition Responsive Input Controllers"; Ser. No. 479,553, filed Aug. 13, 1965, entitled "Condition Responsive Process Timer" (now Patent No. 3,393,604 issued July 23, 1968); Ser. No. 589,335, filed Oct. 25, 1966, entitled "Relay Circuit for Half-Wave Alternating Current Energization and Electronic Timer Employing the Same"; Ser. No. 590,707, filed Oct. 31, 1966, entitled "Electronic Timer Circuits"; the United States patent applications of Klaus Wallentowitz, Ser. No. 589,336, filed Oct. 25, 1966 (now Patent No. 3,417,296 issued Dec. 17, 1968); Ser. No. 591,016, filed Oct. 31, 1966 (now Patent No. 3,417,297 issued Dec. 17, 1968), both entitled "Electronic Timer Circuit(s)"; the United States patent application Ser. No. 595,993 of George J. Yagusic filed Nov. 21, 1966, entitled "Delay on De-Energization Electronic Timers"; and my application Ser. No. 595,955 entitled "Electronic Timer Circuits," filed Nov. 21, 1966. All of the above-identified applications are assigned to the same assignee as the present application and are incorporated herein by reference.

Background of the invention

This invention relates to electronic timer circuits. More particularly, it relates to a novel relay holding circuit for such timers. Such timers are employed in original manufacturers' equipment and must provide timed switching of load relay contacts at minimum possible cost.

In a delay timer having a relay contact output the timing function is initiated by closing a switch energizing a timing circuit. At the end of a timed interval, the load relay is energized and remains energized until the initial energization switch is opened. In an interval timer the load relay is initially energized and is de-energized at the end of the timed interval.

Many timers have been designed, according to the prior art, to effect these functions. They normally employ a resistor-capacitor charging circuit for measuring the time delay. Such a circuit is disclosed in the above-identified application of Klaus Wallentowitz, Ser. No. 405,503. According to that invention, the timing interval is measured by causing a transistor to conduct when the voltage across the timing capacitor reaches a predetermined value as measured against a voltage divider. Thus, the voltage divider, the timing capacitor, and the timing adjustment variable resistor form a bridge circuit across which the control junction of the transistor is connected.

Although this is a very good detection circuit, further means must be provided for energizing the relay. The detector transistor cannot be connected directly into the relay circuit because of the relatively large amount of current required to energize the relay. According to the above-cited Wallentowitz application, a latch circuit or electronic switch is provided, which is switched to its ON condition when the detector transistor detects a predetermined charge on the capacitor. Once this switch is turned on, it remains on and the detector transistor may at some point in the timer cycle again assume its OFF condition without affecting the energization of the output relay.

In other timer circuits according to the prior art, a silicon-controlled rectifier (SCR) is used to control energization of the relay. The SCR may be turned on by a signal provided by the detector transistor but it must be permanently DC biased to effect rapid switching. Furthermore, in order to keep the SCR turned on, current must flow through it at all times. Thus, the relay must be DC operated. Or, if in accordance with the invention disclosed in the above-identified application of Robert S. Lundin, Ser. No. 589,335, the relay is energized with unidirectional pulsating current (i.e., half-wave rectified alternating current) a separate direct current holding circuit must be provided to the silicon-controlled rectifier. These various auxiliary circuits increase the cost of such timers and silicon-controlled rectifiers are more expensive than conventional transistors.

The accuracy of timers may be adversely affected by variations in the supply voltage from which the timing capacitor is charged. In the above-identified application of Wallentowitz, Ser. No. 405,503, this problem is largely eliminated by connecting several diodes in the transistor detector circuit which cause the transistor detector to detect the end of a timing interval at a zero potential crossover, as more fully explained in that application. However, this circuit is relatively expensive and cannot, therefore, be used in many practical applications.

Another difficulty is encountered when designing low cost electronic timer circuits. This is the problem of timing inaccuracy due to variations in ambient temperature. Electrical elements change their values when the ambient temperature changes and this changes the length of time required to charge the timing capacitor to a predetermined potential. According to the prior art, it is often necessary to add extra components that are quite expensive or to use components that have very low coefficients of temperature change. Both of these expedients lead to a large increase in the cost of the timer circuit.

Summary of the invention

It is, therefore, an object of the present invention to provide an electronic timer circuit.

A further object of the invention is to provide a timer circuit having a relay as the output device thereof.

Still another object of the invention is to provide a timer circuit of the above character in which the timing determining element is a capacitor.

A further object of the invention is to provide a timer circuit of the above character in which the end of the timing interval is detected by a semiconductor device.

A still further object of the invention is to provide a timer circuit of the above character in which the detector device is a transistor.

A yet further object of the invention is to provide a timer circuit of the above character in which the detector device remains in the condition that it assumes upon detecting the end of a timed interval until disconnection of the timer electrical supply.

Another object of the invention is to provide a timer circuit of the above character employing no electronic switch or holding contacts to keep the output relay energized at the end of the timed interval.

Yet another object of the invention is to provide a timer circuit of the above character that is relatively insensitive to changes in ambient temperature.

Still another object of the invention is to provide a timer circuit of the above character that is relatively insensitive to line voltage variations.

A further object of the invention is to provide an electronic timer circuit of the above character at low cost.

Other objects of the invention will in part be obvious and will in part appear hereinafter.

The invention accordingly comprises the features of construction, combinations of electrical elements, and electrical circuit arrangements which will be exemplified in the electronic timer circuit herein disclosed. The scope of the invention is indicated in the claims.

The present invention is exemplified in the delay timer 10 shown in the drawing. A bridge type capacitor charging circuit is formed by capacitor C1, timing adjustment variable resistor P5, and a voltage divider comprising resistor R2, potentiometer P3, and resistor R4. The charging of the capacitor is detected by measuring the voltage between the wiper 12 of potentiometer P3 and terminal 14. When the potential between wiper 12 and terminal 14 exceeds the combined forward junction potentials of diode CR1 and the emitter to base junction of transistor Q1, transistor Q1 conducts. This switching is amplified by transistor Q2 which turns ON, energizing relay RY1. Normally closed contacts 16 of relay RY1, open, disconnecting resistor R4 from the negative DC bus 18. The capacitor C1 discharges to some extent through resistor R2, potentiometer P3, diode CR1, and the emitter to base junction of transistor Q1. All during this time charging current is being supplied to capacitor C1 through resistor R1 and variable resistor P5. When the discharge current across capacitor C1 is equal to the charging current across capacitor C1, a current will still be flowing from the wiper of potentiometer P3 through diode CR1, the emitter to base junction of transistor Q1 and resistor P5. Transistor Q1 will therefore remain energized. Transistor Q2 will also remain energized and relay RY1 will remain energized.

Diode CR1 protects the base emitter junction of transistor Q1 against excessive back bias potentials. Furthermore, the action of this diode is to decrease the timing interval when the temperature rises. This decreases the sensitivity of the circuit to variations in ambient temperature. Although the addition of diode CR1 causes the detection across terminals 12 and 14 to occur well away from zero voltage potential, the timer provides remarkable insensitivity to line voltage variations. This is due to the relatively high unidirectional potential of approximately 30 volts applied to the bridge circuit.

The drawings

For a fuller understanding of the nature and objects of the invention, reference should be had to the following detailed description taken in connection with the accompanying drawing, in which the sole figure is a schematic electrical circuit diagram of a preferred embodiment of my invention.

Specific description

Again referring to the drawing, the delay timer shown therein is adapted for connection to a source of 117 volts alternating current potential at terminals 22 and 24. When switch 20 is closed, unidirectional current is supplied through diode CR3 and dropping and surge resistor R8 to filter capacitor C2; direct current being supplied thereby between the DC buses 26 and 18. Switch 16, taking the form of contacts on relay RY1 is normally closed. Thus, current flows through resistors R1 and R2, potentiometer P3 and resistor R4 to establish a reference potential at wiper terminal 12 of potentiometer P3. Charging current also flows through resistor R1, timing capacitor C1, and variable resistor P5.

Initially, the potential at terminal 14 is much higher than the potential at terminal 12. This back biases the emitter to base junction of transistor Q1 and diode CR1. When the potential at terminal 14 exceeds the potential at terminal 12 by an amount greater than the combined forward junction potentials of diode CR1 and the emitter to base junction of transistor Q1, transistor Q1 begins to conduct.

Current then flows through resistors R6 and R7. This causes amplifying transistor Q2 to conduct, energizing relay RY1 connected in series therewith.

Upon energization, relay RY1 opens contact 16 thereof. This causes the emitter to base junction of transistor Q1 to now be connected in parallel with capacitor C1. The values of the components are chosen such that enough current flows through the emitter to base junction of transistor Q1 to keep it turned on, thus keeping transistor Q2 turned on and thus keeping relay RY1 energized until the timer circuit 10 is disconnected from the alternating current supply by opening switch 20.

It will be noted by those skilled in the art that not only does the opening of switch 16 cause this holding circuit on transistor Q1 to come into action; but by disconnecting the voltage divider R1, R2, P3, R4 decreases the load on the filter capacitor C2; thus increasing the holding current to relay RY1.

As previously stated, diode CR1 protects transistor Q1 when the potential at terminal 14 exceeds the potential at terminal 12 and helps to compensate for variation in timing caused by changes in ambient temperature.

Although the detection of the end of the timing interval does not take place at a condition where the potential at terminals 12 and 14 are equal, as is very desirable in accordance with the above-identified application of Klaus Wallentowitz, Ser. No. 405,503, the circuit shown in the drawing is remarkably insensitive to line voltage variations. As previously stated, this is due to the relatively high voltage applied to the bridge circuit of approximately 30 volts.

When the switch 20 is opened, relay RY1 quickly de-energizes through arc-suppressing diode CR2, as is well known in the art.

It will be obvious to those having ordinary skill in the art that the function of an interval timer may be provided by connecting transistor Q2 in parallel with relay RF1 so that the relay is initially energized on closing switch 20 and de-energized when transistor Q2 is turned on, or transistor Q2 can be arranged to be normally in its conducting state and turned off when transistor Q1 turns on. In both cases contacts 16 of relay RF1 would be normally open contacts rather than normally closed contacts. Those skilled in the art will also realize that variable resistor P5 takes the form of a potentiometer and a small fixed resistor connected in series so that the variable resistance can never go below that of the first resistor. Potentiometer P5 thus controls the timing interval and potentiometer P3 provides an adjustment of the timing interval range as discussed in the above-identified applications.

A sixty second full scale interval timer may be provided by employing the following values of components in the circuit 10. Diode CR1 is a type DE50; diode CR2, type DE100; and diode CR3, type DE300; all supplied by Semiconductor Products. Timing capacitor C1 is a 50 microfarad, 50 volt, electrolytic capacitor; and filter capacitor C2 is a 50 microfarad, 75 volts, electrolytic capacitor. Resistor R1 is 1.8 kilohms; resistor R2, 820 ohms; potentiometer P3, 700 ohms; resistor R4, 330 ohms; variable resistor P5 is a 1 megohm potentiometer in series with a 4.7 kilohm resistor; resistor R6 is 3.9 kilohms; resistor R7, 10 kilohms; all of these resistors and potentiometers are rated at one-half watt. Resistor R8 is 2 kilohms, rated at 5 watts. Transistor Q1 is a 2N3703; transistor Q2, a 2N3568. Relay RY1 is a 48 volt direct current relay.

It will thus be seen that the objects set forth above, among those made apparent from the preceding description are efficiently attained and, since certain changes may be made in the above circuit without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An electronic timer circuit comprising:
(A) a source of unidirectional potential;
(B) a voltage divider connected across said source;
(C) a capacitor and a resistance connected in series with each other and in parallel with said voltage divider to form a bridge circuit;
(D) semiconductor valve sensing means connected across said bridge circuit such as to change its state when the charge on said capacitor reaches a predetermined value; and,
(E) a switch
  (a) controlled by the state of said semiconductor valve means, and
  (b) in series with said voltage divider.

2. An electronic timer according to claim 1, wherein said switch is in the leg of said bridge to which said resistance is connected.

3. An electronic timer according to claim 2, and:
(F) a relay; and,
(G) a second semiconductor valve means
  (a) connected in series with said relay across said source of unidirectional potential, and
  (b) said second semiconductor valve means controlled by said first semiconductor valve means.

4. An electronic timer according to claim 2, and:
(F) a resistance connected in series with said bridge circuit and across said source of unidirectional potential.

5. An electronic timer according to claim 4, and:
(G) a relay; and,
(H) a second semiconductor valve means
  (a) connected in series with said relay across said source of unidirectional potential, and
  (b) said second semiconductor valve means controlled by said first semiconductor valve means.

6. An electronic timer according to claim 1, and:
(F) a semiconductor diode connected in series with said semiconductor valve sensing means across said bridge circuit.

7. An electronic timer according to claim 1, and:
(F) a resistance connected in series with said bridge circuit and across said source of unidirectional potential.

8. An electronic timer according to claim 1, and:
(F) a relay; and,
(G) a second semiconductor valve means
  (a) connected in series with said relay across said source of unidirectional potential, and
  (b) said second semiconductor valve means controlled by said first semiconductor valve means.

References Cited

UNITED STATES PATENTS

| | | | |
|---|---|---|---|
| 3,154,725 | 10/1964 | Kadah | 317—154 X |
| 3,268,776 | 8/1966 | Reed | 317—154 X |
| 3,303,396 | 2/1967 | Culbertson | 317—154 X |

JOHN F. COUCH, Primary Examiner

J. D. TRAMMELL, Assistant Examiner

U.S. Cl. X.R.

317—148.5, 153, 154